May 3, 1949.  J. Z. BRUBAKER  2,468,735
THERMOSTAT CONTROLLED MEANS FOR MAINTAINING
DUAL TEMPERATURE IN MOTORS
Filed Aug. 18, 1945  2 Sheets-Sheet 2
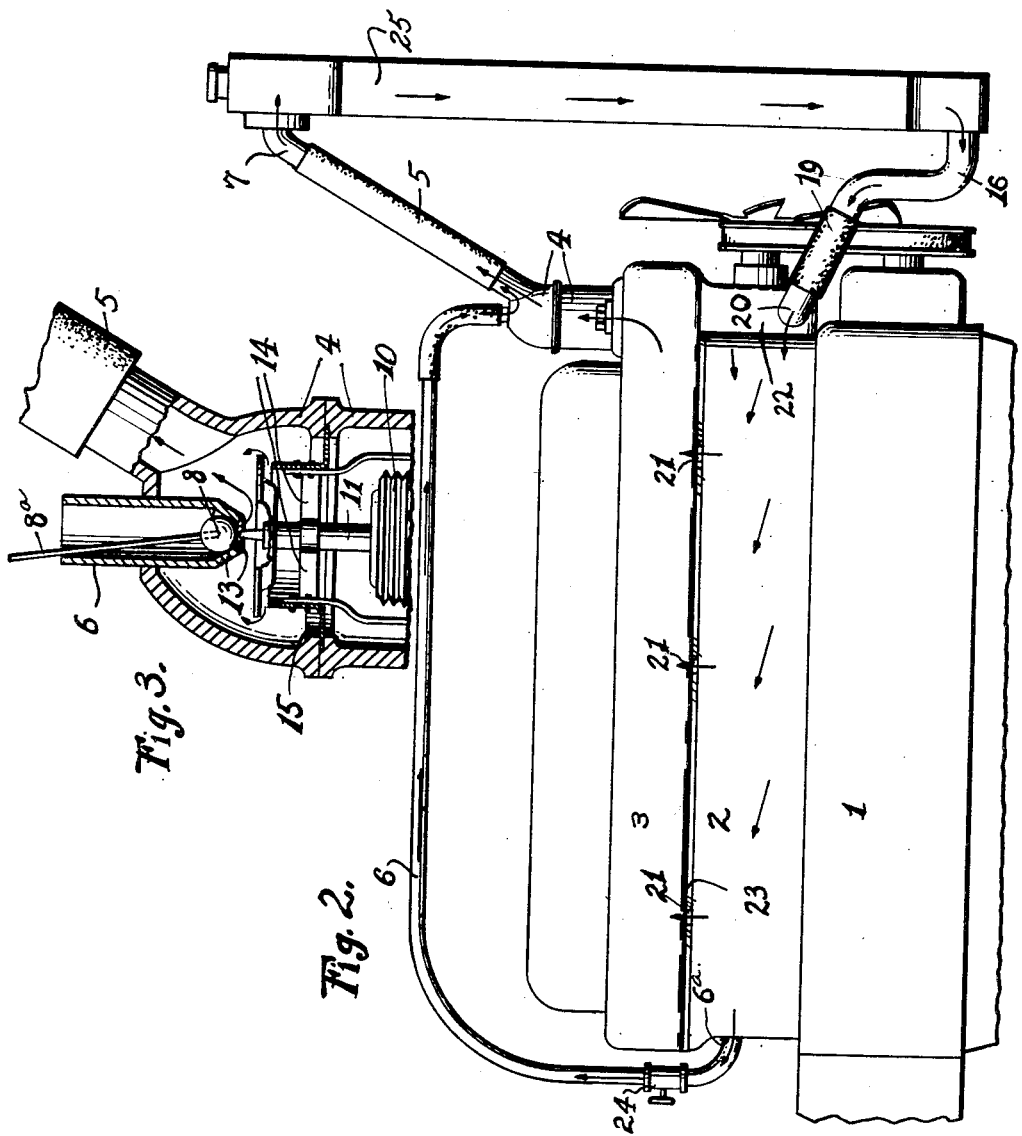
INVENTOR.
JACOB Z. BRUBAKER
BY
Lester L. Sargent
ATTORNEY.

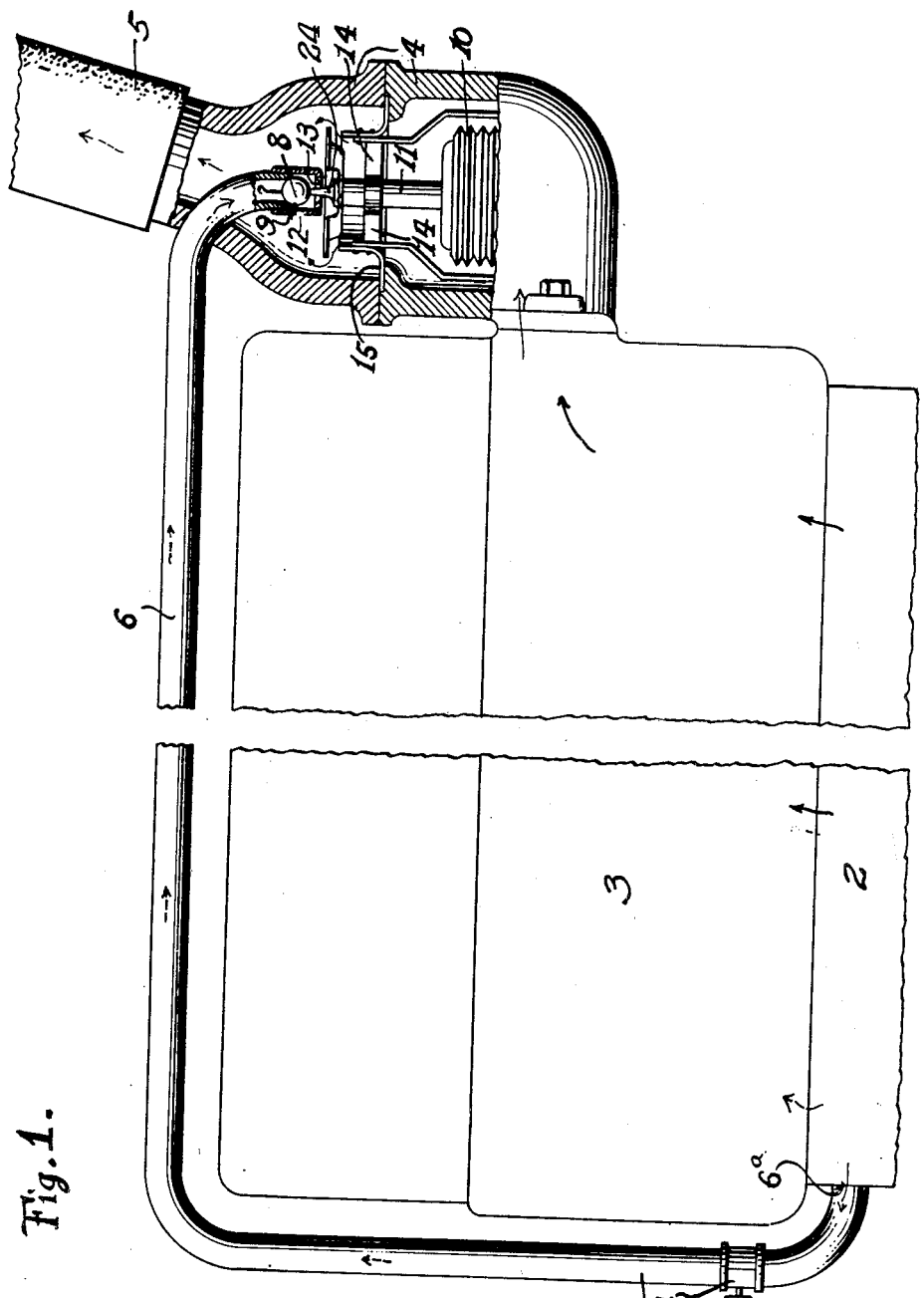

Patented May 3, 1949

2,468,735

UNITED STATES PATENT OFFICE 2,468,735

THERMOSTAT CONTROLLED MEANS FOR MAINTAINING DUAL TEMPERATURE IN MOTORS

Jacob Z. Brubaker, Manheim, Pa.

Application August 18, 1945, Serial No. 611,302

4 Claims. (Cl. 123—178)

This application is an improvement upon the invention described in my Patents 1,789,540, 1,962,134, 1,985,420 and 2,069,749.

The object of my invention is to provide an improvement over my prior cooling systems for maintaining the heat of the head at a higher temperature than in the block of the motor. To improve combustion and maintain proper lubrication, whether the automobile is driven at low or high speed; and to provide novel means for facilitating the starting of the engine in cold weather; and to provide novel means for use in emergency, such as when there is a leaky radiator, and for maintaining the proper operation of the motor. I attain these and other objects of my invention by the apparatus illustrated in the accompanying drawing, in which is shown a side elevation of my invention with a portion of the thermostat casing and the by-pass pipe leading into said casing shown in section in order to illustrate the thermostat.

Fig. 1 is a side elevation of the invention, a portion of the thermostat casing being broken away and shown in section, and a portion of the thermostatic valve mechanism also being shown in section, and Fig. 2 is a side elevation of the invention applied to a motor.

Fig. 3 is a vertical section through the thermostatic valve casing showing a modification of the valve.

Like numerals designate like parts in each of the views.

Referring to the accompanying drawings, I provide a cylinder block 1, having the usual cylinder jacket 2, and a cylinder head 3. Opening out of the cylinder head 3, I provide a thermostat casing and conduit 4. The thermostat casing 4 is connected to a rubber coupling 5, which, in turn, is connected with the conduit 7 which opens into the upper end of the radiator 8.

An outlet 6a at the rear of the cylinder jacket 2, opens into the by-pass 6, which extends up over the cylinder head 3 and into the thermostat casing 4. Opening 9 of by-pass 6 provides a seat for valve 8. Valve 8 is operated by the thermostat bellows 10. When the ball valve 8 is in lowered position, it seats on the valve seat 13 of extension 12 of by-pass 6. When the ball valve 8 is removed for summer driving or when ball is lifted out of seat, the fluid of by-pass hits extension hollow tubing 11 of thermostat 10, thereby retarding the action of the thermostat, thus cooling the fluid in the exposed or extended tube 24. The extension tube 24 also contacts ball 8 to raise it off its seat, and the cold water hits that hollow extension of thermostat stem which retards the action of the thermostat. Valve 8 is actuated by plunger 11 and bellows 10 which cause the valve to seat either on valve seat 13, or over opening 9. The thermostat plunger 11 is guided by the guide element 14 and that element is supported in position by the ring 15. Ring 15 in turn is secured between the two sections of the thermostat casing 4, as shown in Fig. 1.

A conduit 16 opens out of the lower end of the radiator 25 and is connected by rubber coupling 19 with the conduit 20, opening into the pump casing 22 by which water is forced through the water jacket 2, as indicated by the arrows. Some of the water passes through the aperture 21 in the gasket 23, and into the cylinderhead 3. At the same time some of the water passes through the outlet 6a into through the by-pass 6 to the thermostat casing 4, as shown in Fig. 1 of the drawings and thence through conduits 5 and 7 to the upper end of the radiator 8.

As shown in Fig. 2 of the drawing, I provide a suitable manually operated valve 24 in the lower end of the by-pass 6 by which the circulation of the water through that by-pass may be stopped when desired, to meet emergency conditions.

As shown in Fig. 1 in lieu of the manually operated valve 24 I may depend on the thermostat valve 8 for the automatic regulation of the circulation of water through by-pass 6.

In operation the water circulates as indicated by the arrows being pumped by the pump in casing 22 through the water jacket 2, some of the water passing through the apertures 21 in the gasket 23 into the cylinder head 3, and some of the water passing through the outlet 6a into the by-pass 6. From cylinder head 3 the water passes through the thermostat valve casing 4, coupling 5 and conduit 7, into the inlet reservoir of the radiator. From thence it flows downward into the bottom of the radiator and through conduit 16, coupling 19 and conduit 20, to the pump casing 22 to complete the operation.

The water flowing through by-pass 6 completes the circulation of cooler water through the cylinder block, and when it flows into the stream flowing through conduit 7, it is relatively cooler and tends to reduce the temperature of the water or liquid circulating through the motor.

At the outset thermostat 10, closes the flow of water from by-pass 6 into casing 4 and to conduit 5 until the desired temperature is reached, when it will open that conduit and permit some of the water to flow directly through that conduit while a portion of the water continues to flow through by-pass 6.

When an automobile is driven at a speed of 45 miles an hour, or less, the temperature of the water in the cylinder head 3 will be approximately 180 degrees Fahrenheit, while the temperature of the water in the water jacket 2 of the cylinder block will be approximately 100 degrees Fahrenheit. If the automobile is traveling at a high speed of say, 60 miles an hour, or over, the temperature of the water in the cylinder head 3 will drop to approximately 160 degrees Fahrenheit, and the temperature of the water in the water jacket 2 of the block will rise to approximately 120 degrees Fahrenheit. In a case of emergency, where it is necessary to run at low gear, as in traveling through mud, or sand, or snow, or in case of a leaky radiator when the water is low, the operator closes the manually operated valve 24 part way or altogether, to bring about the conventional water circulation.

As shown in Fig. 1 circulation of water through the by-pass 6 is thermostatically controlled by the thermostat 8. In starting the motor when the water is at a low temperature, the valve 8 would be in closed position, while the engine is being warmed up. As the temperature rises, at the predetermined temperature at which the thermostat is set, the valve 8 will open and allow the circulation of water through the by-pass in the manner heretofore described.

What I claim is:

1. In a thermostatically controlled automatic dual temperature system for internal combustion engines, the combination of a cylinder head block having a water jacket, a cylinder head having a water jacket in communication with the said cylinder block water jacket, a radiator, a conduit extending from the cylinder head water jacket to the radiator and having a thermostatic valve therein, a continuously open conduit through which water from the water jacket of the cylinder block may flow into the conduit which leads from the cylinder head to the radiator, but subject to the control of the thermostatic valve, a conduit from the radiator to the adjacent end of the water jacket of the cylinder block, a continuous open conduit from the water jacket of the cylinder block communicating with the thermostat whereby the action of the thermostat controls and stops the flow of cooling liquid in said conduit.

2. In a thermostatically controlled automatic dual temperature system for internal combustion engines, the combination of a cylinder block having a water jacket, a cylinder head having a water jacket in communication with the said cylinder-block water jacket, a radiator, a conduit extending from the cylinder head water jacket to the radiator, a continuously open conduit through which water from the water jacket of the cylinder block may flow into the conduit which leads from the cylinder head to the radiator, but subject to control of the thermostatic valve, a conduit from the radiator to the adjacent end of the water jacket of the cylinder block, a conduit leading from the water jacket of the cylinder block, having an extension provided with a valve seat, a valve adapted to seat over the end of the conduit and on the valve seat, and means thermostatically controlling the operation of said valve.

3. In combination with the mechanism defined in claim 2, a conduit leading from the water jacket of the cylinder block, having a manually operated valve, which can be partly or altogether closed to bring about the conventional circulation when emergency conditions prevail.

4. In a thermostatically controlled automatic dual temperature system for internal combustion engines, the combination of a cylinder block having a water jacket, a cylinder head having a water jacket in communication with the said cylinder block water jacket, a radiator, a conduit extending from the cylinder head water jacket to the radiator and having a thermostatic valve therein, a conduit through which water from the water jacket of the cylinder block may flow into the conduit which leads from the cylinder head to the radiator, but subject to the control of the thermostatic valve, a conduit from the radiator to the adjacent end of the water jacket of the cylinder block, a conduit from the water jacket of the cylinder block communicating with the thermostat whereby action of the thermostat controls the flow of cooling liquid in said combination, the thermostat having an extended tube, and a valve in communication with the extended tube of the thermostat.

JACOB Z. BRUBAKER.

REFERENCES CITED

The following references are of record in the file of this patent:

UNITED STATES PATENTS

| Number | Name | Date |
| --- | --- | --- |
| 1,848,987 | Anibal | Mar. 8, 1932 |
| 2,086,440 | Rushmore | July 6, 1937 |

FOREIGN PATENTS

| Number | Country | Date |
| --- | --- | --- |
| 421,455 | Great Britain | 1934 |